United States Patent [19]

Bajka

[11] 4,318,424
[45] * Mar. 9, 1982

[54] THREE PORT TWO-WAY DIVERTER VALVE WITH INTEGRAL DRAIN ON ONE OUTPUT PORT

[76] Inventor: Peter Bajka, 725 Casita Way, Los Altos, Calif. 94022

[*] Notice: The portion of the term of this patent subsequent to Oct. 2, 1996, has been disclaimed.

[21] Appl. No.: 75,420

[22] Filed: Sep. 14, 1979

Related U.S. Application Data

[63] Continuation of Ser. No. 852,862, Nov. 18, 1977, Pat. No. 4,169,491.

[51] Int. Cl.³ .......................................... F16K 11/085
[52] U.S. Cl. .......................... 137/625.21; 137/625.47
[58] Field of Search ...................... 137/625.47, 625.41, 137/625.24, 625.23, 625.21

[56] References Cited

U.S. PATENT DOCUMENTS

| | | | |
|---|---|---|---|
| 1,425,644 | 8/1922 | Greve | 137/625.23 |
| 2,127,679 | 8/1938 | Dudley | 137/625.23 |
| 3,536,100 | 10/1970 | Marlow et al. | 137/625.47 |
| 3,938,553 | 2/1976 | Ortega | 137/625.47 |

FOREIGN PATENT DOCUMENTS 456416 10/1936 United Kingdom .

*Primary Examiner*—Arnold Rosenthal
*Attorney, Agent, or Firm*—Manfred M. Warren; Robert B. Chickering; Glen R. Grunewald

[57] ABSTRACT

The three port two-way diverter valve includes a generally T-shaped valve body having one input and two output ports connecting to its hollow cylindrical interior. A cylindrical diverter valve member is rotatably disposed within the cylindrical interior of the valve body. The cylindrical valve member is closed at one end and open at the other with the open end disposed in fluid communication with the input port at the base leg of the T-shaped body. The diverter valve member includes a side port of generally semi-cylindrical shape such that when the side port of the valve member is rotated into alignment with one or the other of the two other output ports, the flow entering at the base leg input port is directed through the respective output port disposed in alignment with the side port in the cylindrical valve member. In this manner, the flow entering the base leg may be diverted to either of the output ports, as desired. A drain port is provided in the base leg portion of the T-shaped body adjacent to one of the output ports and the nonapertured semi-cylindrical wall portion of the diverter valve member is externally recessed to as to provide a fluid communication path between the drain port and the associated output port so that fluid may drain back through the valve assembly from the output port through the recess in the valve member to the drain port. A sealing ring structure seals the rotatable valve member within the valve body.

5 Claims, 2 Drawing Figures

THREE PORT TWO-WAY DIVERTER VALVE WITH INTEGRAL DRAIN ON ONE OUTPUT PORT

RELATED APPLICATION

The present application is a continuation application based upon my co-pending application Ser. No. 852,862, filed Nov. 18, 1977, now U.S. Pat. No. 4,169,491, dated Oct. 2, 1979, and entitled, "THREE PORT TWO-WAY DIVERTER VALVE WITH INTEGRAL DRAIN ON ONE OUTPUT PORT."

BACKGROUND OF THE INVENTION

The present invention relates in general to three port two-way diverter valves and, more particularly, to such a valve incorporating an integral drain port associated with one of the output ports of the two-way diverter valve.

DESCRIPTION OF THE PRIOR ART

Heretofore, three port two-way diverter valves have been utilized for diverting the flow of pool water in a swimming pool application either from the pump and filter to the heater and pool or, alternatively, from the pump and filter to the solar heating panels and thence to the pool. Such a diverter valve is disclosed in U.S. Pat. No. 3,938,533 issued Feb. 17, 1976. The valve can be either manually operated by means of a handle or can be coupled to an automatic valve actuator or operator for actuation in response to electrical signals fed to the valve operator. Such a valve operator is commercially available from Bajka Engineering Enterprises, 333 Fairchild Drive, Mountain View, Calif.

One of the problems with use of the prior art diverter valve, in a swimming pool application as above described, is, that when certain types of solar heating panels are employed, such as metallic panels, the panels must be drained when not in use otherwise the panels reach boiling temperature boiling water inside the panels and producing undesired deposits inside the channels of the solar heating panels, thereby deleteriously affecting their thermal conductivity and heating efficiency. To avoid this problem, utilizing the aforecited three port two-way diverter valve, it was common to provide an additional valve in the line interconnecting the diverter valve and the solar heating panels, such additional valve being solenoid operated, so that when the flow of pool water was diverted from the panels to the normal pool heater, the solenoid was actuated to open the line to the solar heating panels to exhaust their fluid to a drain through the solenoid valve.

While this arrangement provides a means for draining the panels, it is relatively complicated and expensive and it is desired to provide a less complicated and less costly method for automatically draining the solar heating panels when the flow of pool water is diverted from the panels to the normal pool heater and pool.

SUMMARY OF THE PRESENT INVENTION

The principal object of the present invention is the provision of an improved three port two-way diverter valve incorporating an automatic drain feature for draining one of the output ports.

In one feature of the present invention, a drain port is coupled into the valve body and the diverter valve member includes a passageway providing fluid communication between the port to be drained and the drain port when the flow of pool water is diverted by the diverter valve member to the other output port.

Other features and advantages of the present invention will become apparent upon a purusal of the following specification taken in connection with the accompanying drawings wherein:

DESCRIPTION OF THE PREFERRED EMBODIMENTS

Figure 1:
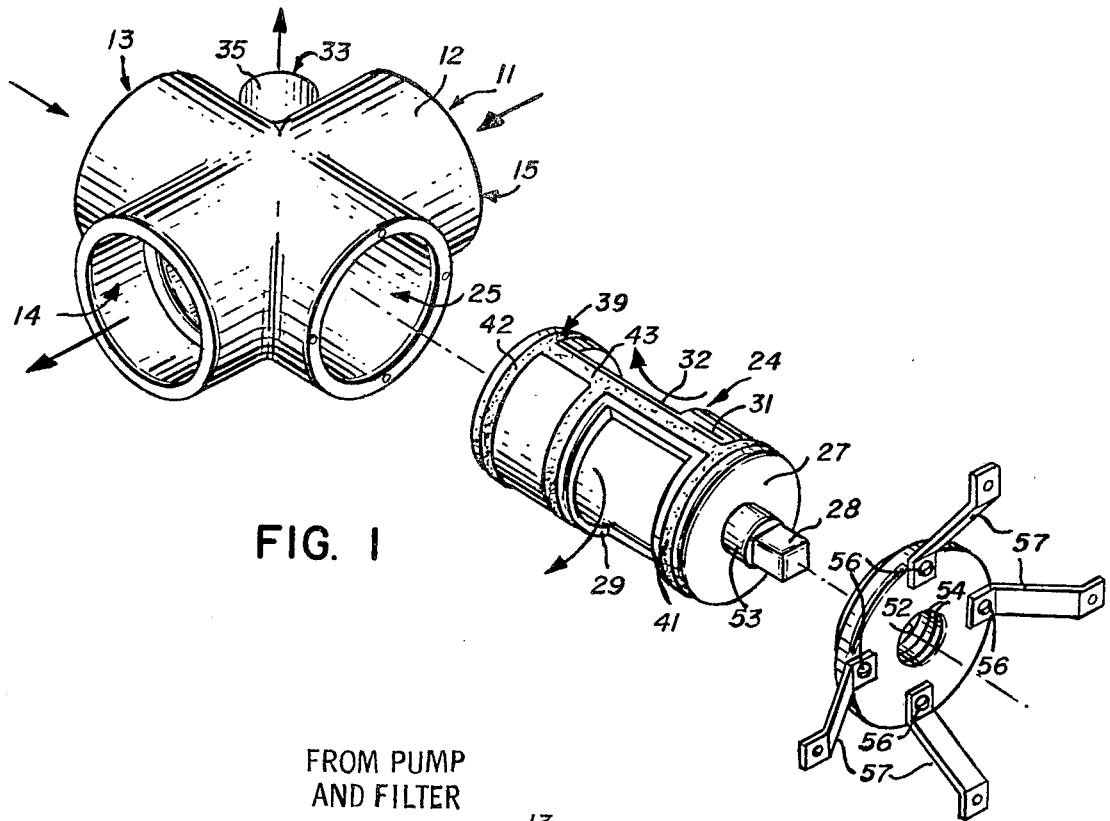
FIG. 1 is an exploded perspective view of a three port two-way diverter valve incorporating features of the present invention.
Figure 2:
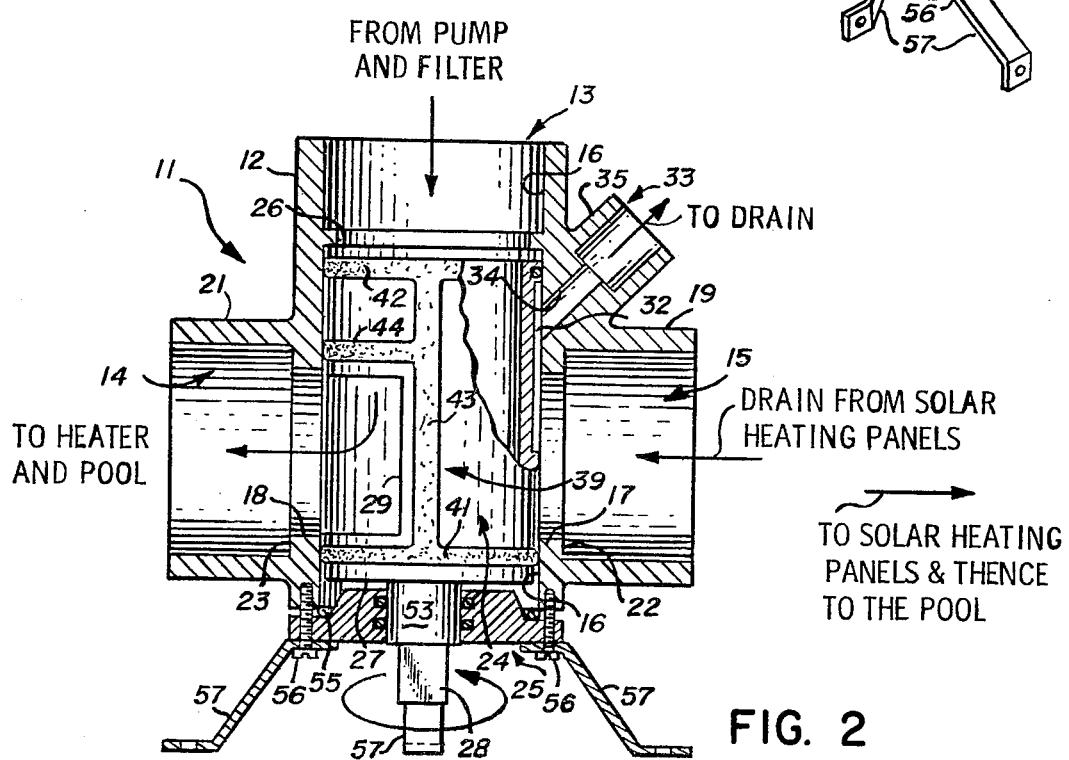
FIG. 2 is a longitudinal sectional view of the valve of FIG. 1.

Referring now to FIGS. 1 and 2, there is shown a three port two-way diverter valve 11 incorporating features of the present invention. The valve 11 includes a valve body 12, as of high temperature polyvinylchloride or bronze having a generally T-shaped configuration for providing an input port 13 and two output ports 14 and 15. The inside of the valve body 12 includes an inner cylindrical bore 16 extending generally longitudinally of the base leg portion of the T-shaped body member. A pair of coaxially aligned transverse bores 17 and 18 intersect the longitudinal bore 16, such transverse bores being at the inner terminal ends of a pair of collar portions 19 and 21, respectively, to facilitate coupling to relatively large diameter pipe, such as one and one-half inch, two inch or three inch PVC or copper. Internal shoulders 22 and 23 are provided for butting against the inner ends of pipe sections which slip fit into the respective collar portions 19 and 21 for making connection to external piping.

A generally hollow cylindrical valve member 24 is slidably received within the cylindrical bore 16 from an open end 25 of the valve body 12. The inner end of the valve member 24 abuts an internal shoulder 26 of the longitudinal bore 16, near the input port or opening 13, such internal shoulder also serving to abut the inner end of piping coupled to the input port 13. The hollow cylindrical valve member 24 is closed at one end by a transverse wall 27 and a rectangular cross section stem 28 is fixedly secured coaxially of the cylindrical valve member 24 at the end wall 27. The stem member 28 is coupled to a suitable valve actuator member, such as a handle or automatic valve operator of the type commercially available from Bajka Engineering Enterprises of Mountain View, Calif.

The valve body 12 includes a cover portion 51 which closes off the valve stem end of the cylindrical cavity 16 in the valve body 12. The cover portion 51 includes a central longitudinal bore 52 to accommodate a cylindrical portion 53 of the valve stem 28. A pair of O-rings 54 carried within circular grooves in the inside wall of the bore 52 serve to seal the stem 28 to the cover 51. A third O-ring 55 seals the periphery of the cover portion 51 to the remainder of the valve body 12. The cover portion 51 is secured to the remainder of the valve body 12 via longitudinally directed screws 56 passing through aligned holes in the cover portion 51 and threadably mating with the tapped bores in the valve body 12. Four outwardly directed support leg members 57 are affixed to the cover portion 51 and serve to support the valve operator, not shown.

The valve member 24 is made of the same material as the valve body member 12 or other suitable material and includes a semi-cylindrical side opening 29 having an axial extent substantially axially coextensive with the size of the opening 18 in the side wall of the valve body 12. When the valve member 24 is in the position as shown in FIG. 2 liquid, such as swimming pool water derived from the pool pump and pool filter, is fed into the input port 13 through the open end of the valve member 24 and thence through the side opening 29 of the valve member through the aligned output port 18 into the piping to the pool heater and swimming pool. When the valve member 24 is in the position for diverting the pool water to the heater and pool, a solid semi-cylindrical wall portion 31 of the valve member 24 blocks the flow of pool water, fed into the valve body at 13, from passing out of the second output port 15. However, when the second output port 15 is connected to an array of solar heating panels, particularly of the type that can boil in the absence of a flow of fluid therethrough, the panels are drained by means of a recessed portion 32 on the exterior of the solid semi-cylindrical wall portion 31, such recessed portion 32 having an axial extent sufficient to provide a fluid flow communication passageway between the second output port 15 and a drain port 33. The drain port 33 includes a central bore 34 extending at approximately 45° to the plane containing the output ports 14 and 15 and such plane being perpendicular to the longitudinal axis of the central bore 16. The drain bore 34 intersects the recess 32 such that fluid drains from the solar heating panels back through the second output port 15 and thence through the recess 32 into the drain bore 34 and thence to the drain pipe, not shown, which fits within a collar portion 35 coaxially disposed of the drain bore 34.

When the valve member 24 is rotated 180° so as to divert the pool water from the pump and filter out the second output port 15 to the solar heating panels via the side opening 29 in the valve body, the drain recess 32 in the solid cylindrical portion 31 of the valve body is not in fluid communication with any other port other than the other output port 14 so that fluid does not drain back through the output port 14 and this output port 14 is blocked by means of the solid cylindrical wall portion 31 of the valve member 24.

The peripheral extent of the side opening 29 in valve body 24 is such that as the valve member 24 is rotated through 180°, flow of fluid from the pump and filter via input port 13 is merely continuously diverted with a gradually increasing percentage being diverted from one of the output ports 14 to the other output port 15 rather than the flow being stopped and started again as the valve member 24 rotates in the valve body 12. This prevents undue back pressure from being developed on the pump and other elements between the pump and the valve 11.

A silicone rubber seal assembly 39 is mounted within grooves in the exterior surface of the hollow cylindrical valve member 24. More particularly, the seal assembly 39 includes a pair of circular end portions 41 and 42 disposed in circular grooves at opposite ends of the valve member 24 for sealing opposite ends of the valve member to the interior wall of the bore 16 in the valve body 12. The end portions 41 and 42 of the sealing ring 39 are connected together via the intermediary of a pair of diagonally opposed longitudinally directed leg portions 43 which extend along the side marginal edges of the side opening 29 in the valve member 24. In addition, a semicircular portion 44 of the seal assembly 39 interconnects the leg portions 43 and extends about the end lip portion of the side opening 29 in the valve member 24 for completing the seal around the side opening 29 in the valve member 24.

Thus, the composite sealing ring structure 39 comprises a hollow cylindrical sealing ring having first, second and third semi-cylindrical side openings the first side opening extending substantially the full axial extent of the sealing ring structure 39 and the second and third semi-cylindrical side openings being on the opposite side from the first, and the second semi-cylindrical side opening being axially coextensive with the side opening 29 in the valve member 24 and extending about the periphery thereof and the third side opening being axially spaced from the second side opening. The sealing assembly 39 is made of a suitable material such as silicone rubber.

The advantage of the diverter valve assembly 11 of the present invention is that it incorporates an integral drain port interconnected via the recess 32 with one of the main output ports, such as output port 15. In this manner, an automatic drain feature is provided for output port 15, thereby obviating the prior art requirement of a separate solenoid operated drain valve mechanism. This substantially reduces the cost and complexity of a two-way three port diverter valve and drain.

In an alternative embodiment of the present invention, the drain port 33 is located in the cover portion 51 of the valve body 12 and fluid communication between the output port 15 and the drain port is provided via the intermediary of a recessed portion of the valve member extending axially of the valve member in the center of the solid semi-cylindrical portion 31 thereof from the port 15 to the cover portion 51 under the end circular seal portion 41. A half moon shaped sealing ring is disposed in the outer surface of the end wall 27 of the valve member 24 on the side of the valve stem opposite to that of said semi-cylindrical wall portion 31 to seal the other output port 14 from the drain port when the valve member 24 is rotated to a position so that the side port 29 in the valve member is in alignment with the output port 15. This half moon shaped sealing ring seal is compressed between the inside wall of the cover portion 51 and the end wall 27 of the valve member 24. The drain port is on the side of the cover 51 adjacent the output port 15.

What is claimed is:

1. A diverter valve including a valve body having a cavity with first, second and third openings communicating with said cavity, and a valve member having passageway means extending therethrough between an open end and a side opening, said valve member being mounted for movement inside said cavity between a position in which said side opening is aligned with said second opening when said end opening is aligned with said first opening and a position in which said side opening is aligned with said third opening when said end opening is aligned with said first opening for flow of fluid from said first opening to a selected one of said second opening and said third opening, wherein the improvement in said diverter valve comprises:

said valve body being formed with a fourth opening communicating with said cavity; and said valve member being formed to provide a drain passageway extending for fluid flow from said third opening to said fourth opening when said side opening is aligned with said second opening, and said valve member being provided with sealing means positioned to seal said fourth opening when said side opening is aligned with said third opening.

2. The diverter valve as defined in claim 1 wherein, said valve member is formed with a recess therein to provide said drain passageway.

3. The diverter valve as defined in claim 1 wherein, said drain passageway is defined between said valve body and said valve member.

4. The diverter valve as defined in claim 1 wherein, said side opening of said valve member is formed with a width dimension which is sufficient to span a distance between said second and third openings such that said valve is always open with flow communication being provided between said first opening and both said second and third openings when said valve member is in an intermediate position with said side opening of said valve member out of alignment with said second opening and out of alignment with said third opening.

5. The diverter valve as defined in claim 1 wherein, said second opening and said third opening are angularly spaced about 180° apart and said fourth opening is substantially angularly aligned with said third opening.

* * * * *